United States Patent
Donels et al.

(10) Patent No.: US 12,073,425 B1
(45) Date of Patent: *Aug. 27, 2024

(54) SYSTEMS AND METHODS FOR MULTIPLE OFFER SOURCE AGGREGATOR

(71) Applicant: Wells Fargo Bank, N.A., San Francisco, CA (US)

(72) Inventors: Krista L. Donels, San Francisco, CA (US); Jennifer Miller, San Francisco, CA (US); David Patron, San Francisco, CA (US); Matthew S. Rogers, Hoboken, NJ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,704

(22) Filed: Oct. 3, 2022

Related U.S. Application Data

(63) Continuation of application No. 16/259,386, filed on Jan. 28, 2019, now Pat. No. 11,461,796.
(Continued)

(51) Int. Cl.
G06Q 30/02 (2023.01)
G06Q 30/0207 (2023.01)

(52) U.S. Cl.
CPC ..... *G06Q 30/0215* (2013.01); *G06Q 30/0236* (2013.01); *G06Q 30/0239* (2013.01)

(58) Field of Classification Search
CPC ........... G06Q 30/0215; G06Q 30/0236; G06Q 30/0239
See application file for complete search history.

(56) References Cited

U.S. PATENT DOCUMENTS 7,962,931 B2    6/2011  Bova
9,226,151 B2   12/2015  Mohammed et al.
(Continued)

FOREIGN PATENT DOCUMENTS

WO   WO-2015148693 A1 *  10/2015  ......... G06F 16/2358

OTHER PUBLICATIONS

Abhishek et al., The Potential of Mobile Coupons: Current Status and Future Promise, 2014, Indian Institutional Repository Working Papers http://vslir.iima.ac.in:8080/jspui/handle/11718/13309, pp. 1-24 (Year: 2014).*
(Continued)

*Primary Examiner* — John Van Bramer
(74) *Attorney, Agent, or Firm* — Foley & Lardner LLP

(57) ABSTRACT

Systems, methods, and apparatuses for aggregating merchant offers include a network interface structured to facilitate data communication via a network, an accounts database structured to store account information associated with accounts held by the provider, including a payment account associated with a customer, and a processing circuit comprising a processor and memory. The processing circuit is structured to receive a pre-filtered offer from an offer vendor, aggregate the pre-filtered offer with other received pre-filtered offers from multiple offer vendors to create an aggregated offer list, filter the aggregated offer list based on the account information for the customer to create a filtered offer list, generate a prioritized offer list based on the account information for the customer, and transmit the prioritized offer list to a customer device of the customer.

18 Claims, 8 Drawing Sheets

Related U.S. Application Data

(60) Provisional application No. 62/623,200, filed on Jan. 29, 2018.

(56) References Cited

U.S. PATENT DOCUMENTS

| | | |
|---|---|---|
| 9,477,967 B2 | 10/2016 | Spears et al. |
| 9,639,853 B2 | 5/2017 | Shiffert et al. |
| 9,699,646 B2 | 7/2017 | Poon et al. |
| 9,704,157 B1 | 7/2017 | Ellis et al. |
| 9,710,821 B2 | 7/2017 | Heath |
| 2011/0087529 A1* | 4/2011 | Angell ............... G06Q 30/0238 235/375 |
| 2011/0145057 A1 | 6/2011 | Jones et al. |
| 2012/0254019 A1 | 10/2012 | Sulkowski et al. |
| 2013/0066703 A1 | 3/2013 | Razy et al. |
| 2013/0246146 A1 | 9/2013 | Fischer et al. |
| 2013/0254028 A1 | 9/2013 | Salci |
| 2014/0025452 A1 | 1/2014 | Knowles et al. |
| 2014/0180817 A1* | 6/2014 | Zilkha ............... G06F 16/24575 705/14.55 |
| 2014/0297424 A1 | 10/2014 | Head et al. |
| 2014/0324627 A1* | 10/2014 | Haver ............... G06Q 30/0273 701/519 |
| 2016/0148241 A1* | 5/2016 | Walsh ............... G06Q 30/0238 705/14.26 |
| 2016/0171540 A1 | 6/2016 | Mangipudi et al. |
| 2017/0178189 A1 | 6/2017 | Hu et al. |

OTHER PUBLICATIONS

Acquisti et al., "Conditioning Prices on Purchase History", Marketing Science 24.3 (Summer 2005): 367-381.

* cited by examiner

SYSTEMS AND METHODS FOR MULTIPLE OFFER SOURCE AGGREGATOR

CROSS-REFERENCE TO RELATED APPLICATIONS

The present application is a continuation of U.S. patent application Ser. No. 16/259,386, filed Jan. 28, 2019, which claims the benefit of U.S. Provisional Application No. 62/623,200, filed Jan. 29, 2018, each of which is incorporated herein by reference.

TECHNICAL FIELD

Embodiments of the present disclosure relate generally to the field of targeted offers.

BACKGROUND

Many offer providers/vendors or merchants offer rewards to customers, which are then presented to customers in a targeted manner. Merchants or offer vendors can use analytics to deliver these targeted offers to customers. For example, some offer vendors provide rewards to customers who use particular merchants on a regular basis. Accordingly, as a customer spends funds at the merchant, the customer's spending habits are captured and the customer can earn reward offers at that merchant. The merchant and/or offer vendor uses the spending habits of the customer at a particular merchant to offer targeted offers to that customer. The customer can then redeem those offers at the merchant. However, offer vendors and merchants may be limited in the visibility into spending habits of customers and offers provided across multiple merchants and offer vendors, as well as limited in the utilization of customer behavior and financial information in determining targeted offers for a customer.

SUMMARY

A first example embodiment relates to a provider computing system. The provider computing system includes a network interface structured to facilitate data communication via a network, an accounts database structured to store account information associated with accounts held by the provider, including a payment account associated with a customer, and a processing circuit comprising a processor and memory. The processing circuit is structured to receive a pre-filtered offer from an offer vendor, aggregate the pre-filtered offer with other received pre-filtered offers from multiple offer vendors to create an aggregated offer list, filter the aggregated offer list based on the account information for the customer to create a filtered offer list, generate a prioritized offer list based on the account information for the customer, and transmit the prioritized offer list to a customer device of the customer.

Another example embodiment relates to a computer-implemented method. The method includes receiving, by a provider computing system, a pre-filtered offer from an offer vendor, where the pre-filtered offer including a merchant name and a value, aggregating the pre-filtered offer with other received pre-filtered offers from multiple offer vendors to create an aggregated offer list, filtering the aggregated offer list based on the account information for the customer to create a filtered offer list, where the filtered offer list comprises a subset of the aggregated offer list, generating a prioritized offer list based on the account information for the customer, and transmitting the prioritized offer list to a customer device of the customer.

A further example embodiment relates to an apparatus. The apparatus includes a provider offer aggregation circuit included in a provider computing system associated with a provider. The provider offer aggregation circuit is structured to receive a pre-filtered offer from an offer vendor, where the pre-filtered offer includes a merchant name and a value, aggregate the pre-filtered offer with other received pre-filtered offers from multiple offer vendors to create an aggregated offer list and filter the aggregated offer list based on the account information for the customer to create a filtered offer list, where the filtered offer list comprises a subset of the aggregated offer list. The apparatus further includes a prioritization circuit structured to generate a prioritized offer list based on the account information for the customer and a notification circuit structured to transmit the prioritized offer list to a customer device of the customer.

A further example embodiment relates to a mobile device. The mobile device includes a network circuit structured to communicate data to and from a provider computing system associated with a provider, an input/output device structured to exchange data with a customer, and a processing circuit comprising a processor and memory. The processing circuit is structured to receive a first graphical interface displaying a filtered offer list from the provider computing system, the first graphical interface identifying at least one offer prioritized for the customer generated by the provider computing system and enabling the customer to select the at least one offer for redemption at a merchant, receive a first input from the customer via the input/output device, the first input indicating a customer selection of the at least one offer, and transmit, responsive to the first input, at least one offer to a merchant point-of-sale (POS) terminal.

These and other features, together with the organization and manner of operation thereof, will become apparent from the following detailed description when taken in conjunction with the accompanying drawings.

DETAILED DESCRIPTION

Figure 1:
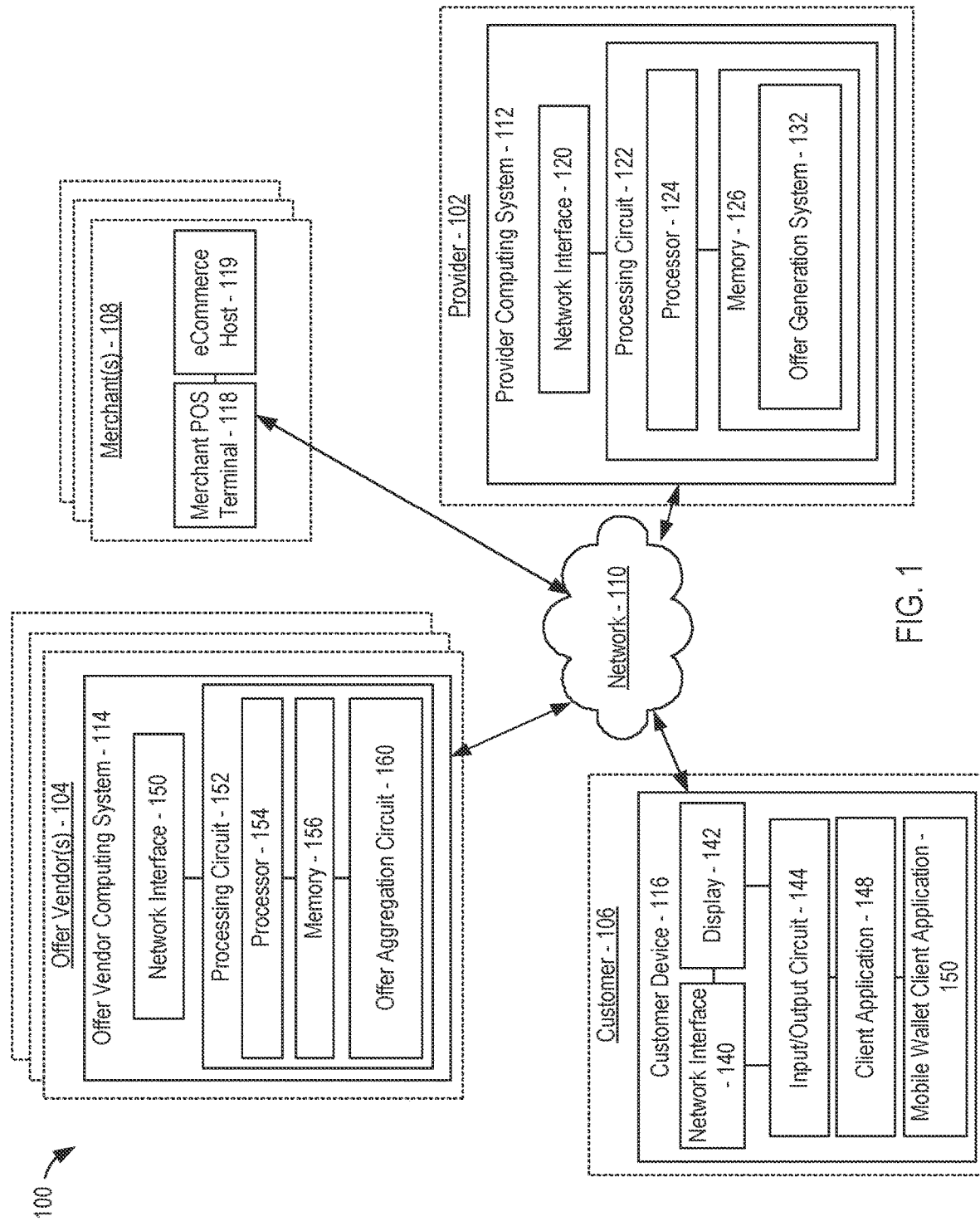
FIG. 1 is a schematic diagram of an offer aggregation system, according to an example embodiment.

Referring to the figures generally, systems, methods, and apparatuses for generating and providing one or more offers are described herein. A customer of one or more merchants can receive offers for use at those merchants. The offers are targeted to the customer based on aggregation of offers across all merchants and offer vendors, the spending habits of the customer, the customer behavior, and preset preferences of the customer. As used herein, the term "offer" refers to a reward or incentive provided by a merchant and/or an offer vendor to a customer of the merchant. For example, an offer can include a percentage of a single item or entire purchase at the merchant (e.g., 10% off entire purchase), and can also include a certain monetary discount (e.g., $5 off at $50 purchase). As another example, an offer can include a purchase incentive, such as a buy-one-get-one type of offer (e.g., buy one coffee, get one coffee free). According to various embodiments, the system described herein facilitates the aggregation and targeting of offers from not just one source, but from various sources including both offer vendors and merchants. Accordingly, the system provides a secondary or tertiary filter (e.g., aggregation and targeting) of all offers received from offer vendors and merchants. Offers received from offer vendors will have likely undergone a first layer of aggregation and targeting across multiple merchants. The system described herein provides a further aggregation and targeting of offers to provide only the most relevant offers for a particular customer. Using additional internal customer information potentially known only to the provider, the system can further tailor the offers based on customer preferences, account information, and various other customer profile data.

The embodiments described herein solve the technical and internet-centric problem of combining information regarding customer behavior with payment account information that may be accessible only by a provider. By leveraging uniquely assembled information sets using customer behavior and customer account data, the systems and methods described herein facilitate the delivery of targeted merchant offers to customers. In this regard, the systems and methods herein integrate previously unconnected data to provide personalized reward offers to the benefit of customers with payment accounts at the provider. Accordingly, the customer can potentially increase utilization of earned offers and potential earning of such offers, thus increasing customer usage of payment accounts associated with the provider. In addition, the offers are delivered to a targeted channel in a timely manner that is personalized for each customer and situation, allowing the customer to immediately use the offers when most appropriate (e.g., customer is standing outside the merchant brick-and-mortar location), rather than having to waste time compiling and/or searching for offers prior to visiting a merchant. Moreover, the systems and methods herein generate a prioritized list of offers for each customer, thus allowing for more visibility into a customer's potential reward offer options without requiring the customer to sift through an overwhelming amount of offers.

Referring to FIG. 1, a block diagram of an offer aggregation system 100 is shown according to an example embodiment. Generally, the system 100 facilitates targeted offer generation using filtration and aggregation of already-targeted offers from multiple offer vendors and merchants. In the described system 100, the customer 106 holds a payment account (e.g., a credit account, a line of credit, a demand deposit account, a prepaid account, etc.) maintained by the provider 102. The customer 106 uses the payment account to earn reward offers at various merchants 108. Reward offers can also be earned using payment accounts unassociated with the provider 102. Merchants 108 at which the customer 106 shops provide targeted offers directly to the provider 102 and also provide spending data and/or targeted offers to the offer vendors 104. The offer vendors 104 further aggregate and target the offers and deliver those offers to the provider 102. As noted, a portion of the offers received by the provider 102 have already been aggregated and/or filtered for a specific customer by the offer vendor 104. The provider 102 also receives targeted offers directly from merchants 108. Based on the various aggregated and targeted offers received from merchants 108 and offer vendors 104, the provider 102 then provides a final (e.g., second, third, or more) aggregation and targeting layer of filtering such that only the most relevant targeted offers are provided to the customer 106. The system 100 receives the offers, and not only filters the offers based on all received targeted and aggregated offers, but also based on internal customer behavior and account information.

Referring to FIG. 1, the system 100 includes a provider computing system 112 associated with a provider 102, where the provider computing system 112 is communicably and operatively coupled to a merchant point-of-sale (POS) terminal 118 and eCommerce host 119 associated with one or more merchants 108, an offer vendor computing system 114 associated with one or more offer vendors 104, and a customer device 116 associated with a customer 106, over a network 110. The network 110 provides communicable and operative coupling between the customer device 116 and the provider computing system 112, and other components disclosed and described herein to provide and facilitate the exchange of communications (e.g., data, instructions, messages, values, commands, etc.). Accordingly, the network 110 may include any network including wired (e.g., Ethernet) and/or wireless networks (e.g., 802.11X, ZigBee, Bluetooth, WiFi, etc.). In some arrangements, the network 110 includes the Internet. In further embodiments, the network 110 includes a proprietary banking network to provide secure or substantially secure communications.

The offer vendor computing system 114 is associated with one or more offer vendors 104. An offer vendor 104 includes any entity receiving reward offers from merchants and aggregating and targeting reward offers for the merchants' customers. The offer vendor computing system 114 includes a processing circuit 152 having a processor 154 and a memory 156. The processor 154 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 156 (e.g., RAM, NVRAM, ROM, Flash Memory, hard disk storage, etc.) may store data and/or computer code for facilitating the various processes described herein. Moreover, the one or more memory devices 156 may be or include tangible, non-transient volatile memory or non-volatile memory. Accordingly, the one or more memory devices 156 may include database components, object code components, script components, or any other type of information structure for supporting the various activities and information structures described herein.

The offer vendor computing system 114 further includes a network interface 150, which is used to establish connections with other components of the system 100 by way of network 110. The network interface 150 includes program logic that facilitates connection of the offer vendor computing system 114 to the network 110. The network interface 150 supports communication between the offer vendor computing system 114 and other systems, such as the provider computing system 112 and the customer device 116. For example, the network interface 150 includes a cellular modem, a Bluetooth transceiver, a Bluetooth beacon, a radio-frequency identification (RFID) transceiver, and a near-field communication (NFC) transmitter. In some arrangements, the network interface 150 includes the hardware and machine-readable media sufficient to support communication over multiple channels of data communication. Further, in some arrangements, the network interface 150 includes cryptography capabilities to establish a secure or relatively secure communication session with the offer vendor computing system 114. In this regard, financial data (or other types of data) may be encrypted and transmitted to prevent or substantially prevent the threat of hacking.

The offer vendor computing system 114 further includes an offer aggregation circuit 160. The offer aggregation circuit 160 is configured to receive targeted reward offers, aggregate the reward offers for a particular customer 106, and generate reward offers most relevant to the customer 106. As such, the offer aggregation circuit 160 is communicably and operatively coupled to a merchant computing system associated with a merchant 108 to receive offers generated for customers of the merchant 108. The offer aggregation circuit 160 aggregates offers for a customer 106 received from multiple merchants 108, completing a first filter of the offer data for the customer 106. The offer aggregation circuit 160 analyzes the data received from the merchant 108 to complete the first filter of the offer data. The offer aggregation circuit 160 then transmits the aggregated and filtered offers to the provider computing system 112. Accordingly, the offer generation circuit 160 is communicably and operatively coupled to the provider computing system 112 to provide the aggregated and filtered offers.

The customer device 116 includes any type of computing device that may be used to facilitate reward transactions at a merchant 108 and/or provider 102. In some arrangements, the customer 106 uses the customer device 116 to receive and redeem generated reward offers. As such, the customer 106 uses the customer device 116 to provide payment account information and/or reward offer information to a merchant 108. For example, at a merchant POS terminal 118, the customer 106 can present the payment account information in the form of a payment card provisioned to a mobile wallet. As another example, the customer 106 can also provide payment account information to an eCommerce host 119 associated with the merchant 108 during an online transaction. For example, the customer 106 can access the online shopping website associated with a merchant 108 via the customer device 116 and provide payment account information through a checkout feature of the online shopping website, and the eCommerce host 119 then transmits the input information to the provider computing system 112 over the network 110.

Accordingly, the customer device 116 can include any wearable and non-wearable device. Wearable devices refer to any type of device that an individual wears including, but not limited to, a watch (e.g., smart watch), glasses (e.g., eye glasses, sunglasses, smart glasses, etc.), bracelet (e.g., a smart bracelet), etc. The customer device 116 may also include any type of mobile device including, but not limited to, a phone (e.g., smartphone, etc.), and/or any type of computing devices (e.g., desktop computer, laptop computer, personal digital assistant, etc.).

The customer device 116 further includes a display 142, an input/output circuit 144, a network interface 140, and a client application 148. The network interface 140 of the customer device 116 is adapted for and configured to establish a communication session via the network 110 with the provider computing system 112 and in some arrangements, with one or more merchants 108. Accordingly, the network interface 140 includes any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), or a combination thereof (e.g., both a cellular transceiver and a Bluetooth transceiver).

The display 142 is used to present offer information, payment account information, transaction information, and the like. The display 142 is further used to present prompts, notifications, and confirmations to the customer 106. In this regard, the display 142 is communicably and operatively coupled to the input/output circuit 144 to provide a user interface for receiving and displaying information on the customer device 116.

The input/output circuit 144 is structured to receive and provide communication(s) to a customer using the customer device 116. In this regard, the input/output circuit 144 is structured to exchange data, communications, instructions, etc., with an input/output component of the customer device 116. Accordingly, in one embodiment, the input/output circuit 144 includes an input/output device such as a display device, a touchscreen, a keyboard, and a microphone. In another embodiment, the input/output circuit 144 may include communication circuitry for facilitating the exchange of data, values, messages, and the like between an input/output device and the components of the customer device 116. In yet another embodiment, the input/output circuit 144 may include machine-readable media for facilitating the exchange of information between the input/output device and the components of the customer device 116. In still another embodiment, the input/output circuit 144 may include any combination of hardware components (e.g., a touchscreen), communication circuitry, and machine-readable media.

The client application 148 is communicably coupled to the provider computing system 112 (e.g., the accounts database 134, customer profile database 136) via the network 110 and is structured to permit management of the customer's accounts (e.g., payment accounts) and reward offers via the client application 148. In this regard, the client application 148 may provide displays indicative of current account balances, pending transactions, profile information (e.g., contact information), reward offer lists, and the like.

As mentioned herein, via the client application 148, the customer 106 also has the ability to manage any reward offers they have earned through use of a payment account maintained by the provider 102. As such, the client application 148 provides displays indicative of reward offer information received over the network 110 from the provider computing system 112 (e.g. responsive to the offer generation system 132), including, as will be described in greater detail below, aggregated and prioritized merchant offers. In some arrangements, the client application 148 obtains customer input related to the reward offers and the offer information changes responsive to the received customer input, as will be described in greater detail below. In some arrangements, in response to a mobile payment using a payment account associated with a payment card via the mobile wallet client application 150, the client application 148 is configured to update the payment account. Accordingly, the client application 148 is communicably coupled to the mobile wallet client application 150.

The mobile wallet client application 150 is structured to facilitate and permit payments by interfacing with an account (e.g., a checking account) held by the customer 106 at the provider 102. Accordingly, the mobile wallet client application 150 is communicably coupled via the network interface 140 over the network 110 to the provider computing system 112. In some arrangements, the mobile wallet client application 150 also includes a payment processing circuit (not shown) structured to facilitate payments by the customer 106 via the mobile wallet client application 150. For example, the payment processing circuit enables a quickpay capability with a merchant 108. In this regard, the payment processing circuit includes or is communicably coupled with a communication device (e.g., a near-field communication chip) that facilitates the exchange of information between the mobile wallet client application 150 and the merchant POS terminal 118.

In some arrangements, the mobile wallet client application 150 is structured to enable the customer to select a default payment account from a plurality of payment accounts. In this regard, the mobile wallet client application 150 is structured to present displays on the customer device 116 including information pertaining to various payment accounts held by the customer 106 to enable the customer 106 to select a payment account. In some arrangements, the displays presented by the mobile wallet client application 150 include a customer's reward offers as an option for a default payment account. In some arrangements, the mobile wallet client application 150 may obtain a customer input via the input/output circuit 144 and, responsive to the received input, set the account associated with the earned reward offers as the default account with which to make mobile wallet payments for certain transactions.

In some arrangements, the mobile wallet client application 150 includes an API that facilitates the mobile wallet client application 150 receiving information communicated to the customer device 116 by the merchant 108 (e.g., via the merchant POS terminal 118). For example, responsive to the customer 106 engaging in a transaction at a merchant POS terminal 118, the merchant POS terminal 118 is configured to transmit a receipt notification to the customer device 116 identifying various characteristics of the transaction (e.g., a transaction amount, a product identity, and the like). The receipt notification may be in the form of an e-mail, text message, or the like, and viewable via a client application (e.g., the client application 148) implemented on the customer device 116. In some arrangements, the API included in the mobile wallet client application 150 is configured to retrieve receipt notifications received from merchants 108 and determine whether the transactions detailed by the retrieved receipt notifications are in conformance with the requirements of the reward offer redemption.

Still referring to FIG. 1, the provider computing system 112 is associated with the provider 102. The provider 102 may be, for example, a credit card issuer, a bank, or the like. The provider computing system 112 includes a processing circuit 122 having a processor 124 and a memory 126. The processor 124 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 126 (e.g., RAM, NVRAM, ROM, Flash Memory, hard disk storage, etc.) may store data and/or computer code for facilitating the various processes described herein. Moreover, the one or more memory devices 126 may be or include tangible, non-transient volatile memory or non-volatile memory. Accordingly, the one or more memory devices 126 may include database components, object code components, script components, or any other type of information structure for supporting the various activities and information structures described herein.

The provider computing system 112 further includes a network interface 120, which is used to establish connections with other components of the system 100 by way of network 110. The network interface 120 includes program logic that facilitates connection of the provider computing system 112 to the network 110. The network interface 120 supports communication between the provider computing system 112 and other systems, such as the customer device 116. For example, the network interface 120 includes a cellular modem, a Bluetooth transceiver, a Bluetooth beacon, a radio-frequency identification (RFID) transceiver, and a near-field communication (NFC) transmitter. In some embodiments, the network interface 120 communicates via a secured wired connection within a branch of the provider 102. In some arrangements, the network interface 120 includes the hardware and machine-readable media sufficient to support communication over multiple channels of data communication. Further, in some arrangements, the network interface 120 includes cryptography capabilities to establish a secure or relatively secure communication session with the provider computing system 112. In this regard, financial data (or other types of data) may be encrypted and transmitted to prevent or substantially prevent the threat of hacking.

Figure 2:
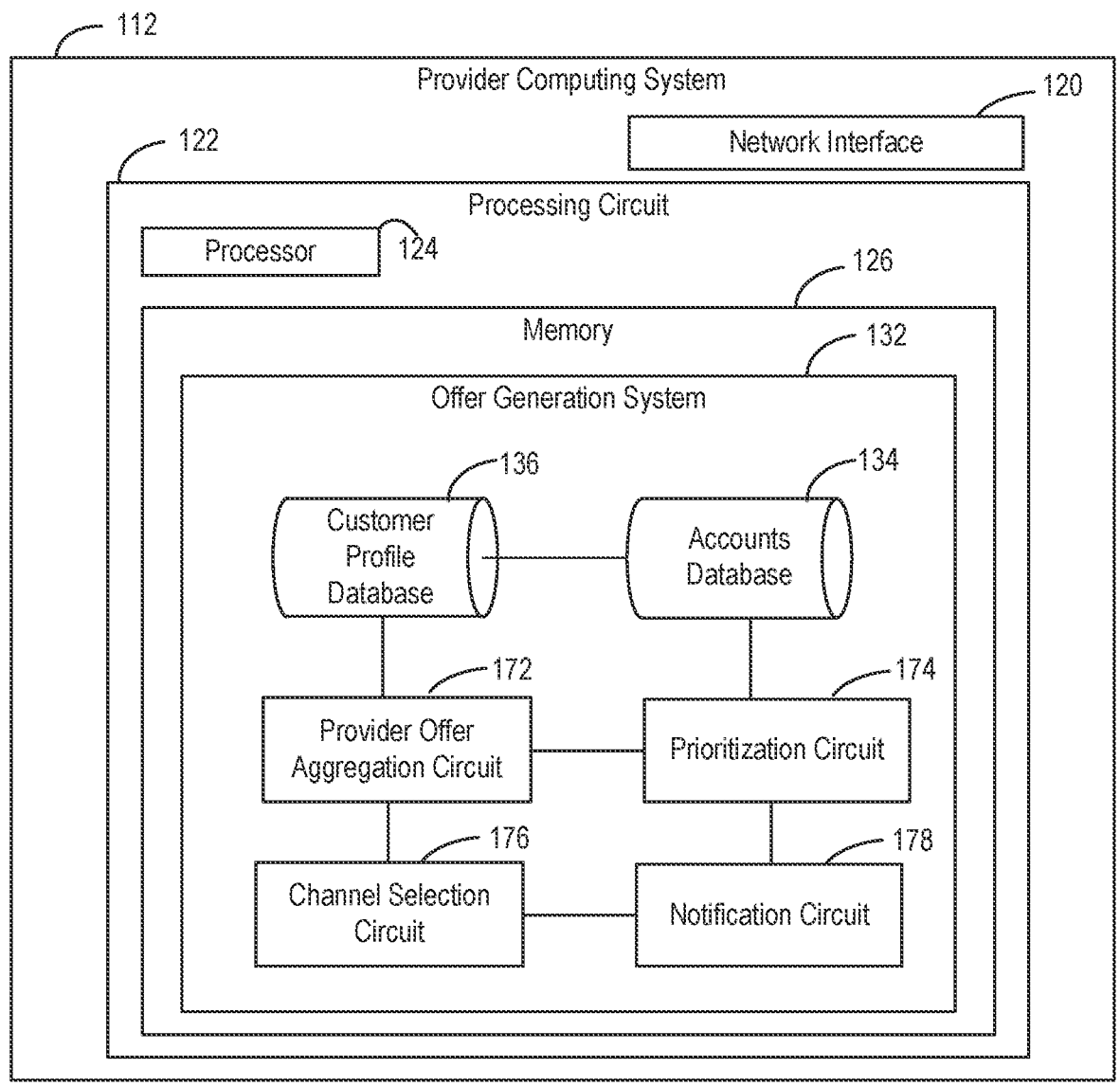
FIG. 2 is a schematic diagram of the provider computing system of FIG. 1, according to an example embodiment.

Referring to FIG. 2, the provider computing system 112 further includes an offer generation system 132. The offer generation system 132 is configured to receive, aggregate, and filter offers for customers 106 of the provider 102. The offer generation system 132 receives pre-aggregated offers from the offer vendor computing system 114 (e.g., offer aggregation circuit 160). In some cases as noted above, the offer generation system 132 receives targeted offers directly from merchants 108. The aggregated offers received from the offer vendor computing system 114 have typically undergone a first aggregation and/or filtration prior to being received by the offer generation system 132. Based on the various aggregated and targeted offers received from merchants 108 and offer vendors 104, the offer generation system 132 then provides a final (e.g., second, third, or more) aggregation and targeting step of filtering such that only the most relevant targeted offers are provided to the customer 106. In this regard, the offer generation system 132 also utilizes internal customer behavior and account information retrievably stored in the accounts database 134 and the customer profile database 136 described below.

The offer generation system 132 includes an accounts database 134. The accounts database 134 is configured to hold, store, categorize, and otherwise serve as a repository for information associated with customer accounts held by the provider 102. For example, the accounts database 134 stores account numbers, account balances, account ownership information, and the like. The accounts database 134 may further store information regarding reward offers associated with payment accounts held at the financial institution 102. For example, the accounts database 134 can include which reward offers are associated with which payment accounts at the provider 102. The accounts database 134 also stores reward offer information such as, whether an offer has been provided to the customer, whether a duplicate offer exists, etc. The accounts database 134 is structured to selectively provide access to information relating to an account at the provider 102. In this regard, as discussed further herein, the accounts database 134 is communicably and operatively coupled to the provider offer aggregation circuit 172, prioritization circuit 174, and channel selection circuit 176 such that the system 100 may facilitate generation of targeted reward offers based on internal customer account information. Although shown as being part of the memory 126, in some arrangements, the accounts database 134 is a separate component of the provider computing system 112.

The offer generation system 132 further includes a customer profile database 136. The customer profile database 136 is configured to hold, store, categorize, and otherwise serve as a repository for information associated with customer behavior and preferences. For example, the customer profile database 136 may store customer personal information, customer device geo-location history, customer preset preferences, customer channel preferences, and the like. The customer profile database 136 is structured to selectively provide access to information relating to a customer profile at the provider 102. In this regard, as discussed further herein, the customer profile database 136 is communicably and operatively coupled to the provider offer aggregation circuit 172, prioritization circuit 174, and channel selection circuit 176 such that the system 132 may facilitate targeted reward offer generation. Although shown as being part of the memory 126, in some arrangements, the customer profile database 136 is a separate component of the provider computing system 112.

The customer profile database 136 is also structured to retrievably store information pertaining to various merchants 108 that customer 106 may transact with. In various arrangements, the information stored in the customer profile database 136 may include, for example, a set of merchant category codes ("MCC") that the provider 102 has associated with the various merchants 108. For example, when a particular merchant 108 first started accepting payments using payment accounts associated with the provider 102, the provider 102 assigned a particular MCC to that merchant 108. These MCC values are transmitted to the provider computing system 112 in any transaction request that the merchant 108 (by, e.g., the merchant POS terminal 118) seeks to have authorized by the provider computing system 112. In some arrangements, other merchant data is stored in the customer profile database 136, such as a set of merchant names, location information for various merchants, and the like.

The offer generation system 112 includes a provider offer aggregation circuit 172, a prioritization circuit 174, a channel selection circuit 176, and a notification circuit 178. Although FIG. 2 shows the circuits as part of the processing circuit 122, in other arrangements one of all of the circuits are embodied as separate processing circuits. Other arrangements may include more or less circuits without departing from the spirit and scope of the present disclosure. Further, some arrangements may combine the activities of one circuit with another circuit to form a single circuit. Therefore, those of ordinary skill in the art will appreciate that the present arrangement is not meant to be limiting.

The provider offer aggregation circuit 172 is structured to receive the pre-aggregated offers from the offer vendor computing system 114 and/or from merchants 108 and complete a final aggregation and targeting filter for the offer data. The provider offer aggregation circuit 172 aggregates all offers received from across various offer vendors 104 and merchants 108. In this way, offers are aggregated across all offer sources to provide a further level of filtration. To provide the further level of filtration, the provider offer aggregation circuit 172 also utilizes customer behavior and account information stored in the accounts database 134 and customer profile database 136. For example, it is reflected in the accounts database 134 that the customer 106 has never made a purchase from a fast food restaurant. In this case, the provider offer aggregation circuit 172 may filter out offers from merchants in the fast food business. As another example, the customer 106 makes daily purchases from Merchant A for coffee. In this case, the provider offer aggregation circuit 172 will provide offers from Merchant A and potentially will provide offers from other merchants selling coffee.

As yet another example, the customer 106 previously made routine purchases at Merchant B, but has not been to Merchant B in over a year. In this case, the provider offer aggregation circuit 172 may provide the offer from Merchant B as a reminder to the customer 106 of Merchant B's goods and/or services. In this case, the provider offer aggregation circuit 172 may also determine whether the customer 106 has given a reason regarding the lack of purchases at Merchant B. For instance, if the customer inputs a preference never to receive offers from Merchant B due to a prior bad experience, the provider offer aggregation circuit 172 will not provide those offers and all offers from Merchant B will be filtered out from the provided offers.

As another example, offers from certain merchant partners are received and provided together (e.g., Merchant A is partnered with Merchant B to promote offers). In this case, the provider offer aggregation circuit 172 provides the offers from both Merchant A and B. In another example, offers from a promoted commercial client of the provider 102 are filtered through to the customer 106 by the provider offer aggregation circuit 172.

The provider offer aggregation circuit 172 is also structured to eliminate duplicate offers received from multiple sources. For example, Merchant A provides Offer 1 directly to the provider 102 and Offer Vendor A similarly provides Offer 1 from Merchant A after aggregating offers from multiple merchants. The provider offer aggregation circuit 172 eliminates one of the two duplicate offers such that only one Offer 1 is provided to the customer 106. This results in a benefit to the customer 106 because the customer 106 saves time that would otherwise be sent sifting through multiple duplicate offers.

The provider offer aggregation circuit 172 is also configured to retrieve and assess customer transaction information, including reward redemption information. In some arrangements, the provider offer aggregation circuit 172 retrieves customer transaction information from the accounts database 134, which stores all the transactions in relation to at least one payment account of the customer at the provider 102. Transaction information may also be communicated locally at the provider computing system 112 when the customer 106 takes certain actions (e.g., opening up a new account, closing an account, redeeming an offer, etc.) in relation to at least one payment account held by the customer 106. In some arrangements, the provider offer aggregation circuit 172 is configured to retrieve transaction and offer redemption information from merchants 108 over the network 110 (e.g., from the merchant POS terminal 118 or the eCommerce host 119) as the transactions occur for storage and assessment.

The prioritization circuit 174 is structured to prioritize and sort the offer data filtered by the provider offer aggregation circuit 172. Accordingly, the prioritization circuit 174 is communicably and operatively coupled to the provider offer aggregation circuit 172. The prioritization circuit 174 analyzes the offer data to create a ranked set of prioritized offers.

In some instances, the set of prioritized offers are ranked from highest priority (shown at top of list) to lowest priority (e.g., shown at bottom of list). The ranked set of prioritized offers are transmitted to the customer device 116 for display. As such, the prioritization circuit 174 is also communicably and operatively coupled to the customer device 116. In one arrangement, the prioritization circuit 174 generates a ranked list of offers (e.g., a "top-ten" offers list) based on relevance to the customer 106. The relevance can be based on the customer behavior and preset preferences stored in the customer profile database 136. Accordingly, the prioritization circuit 174 is also communicably and operatively coupled to the accounts database 134 and the customer profile database 136. The customer behavior can include, but is not limited to, how frequently a customer 106 visits a particular merchant; personal information, such as where the customer 106 lives; customer routine information, such as daily and weekly routines; and customer preferences, such as manually input preferences. As an example, the customer manually inputs a preference for Merchant A into the system to always have Merchant A's offers at the top of all presented offer lists. In this case, Merchant A's offers will be prioritized over other merchants irrespective of other behavioral data. In another example, the customer 106 buys a coffee from Merchant B every morning. In this case, Merchant B offers are prioritized for that customer 106.

In another arrangement, the prioritization circuit 174 generates a ranked list of offers based on the monetary value of the offer. As an example, Merchant A and Merchant B both sell clothing and Merchant A offers a 15 percent off coupon for an entire purchase and Merchant B offers a 10 percent off coupon for an entire purchase. In this case, the offer from Merchant A will be prioritized over the offer from Merchant B. As another example, Merchant A and B offer the same percentage discounts, but Merchant A sells clothing and Merchant B sells vehicles. In this case, the offer from Merchant B will likely be prioritized over the offer from Merchant A due to the higher monetary value of Merchant B's offer. However, if the customer 106 has specified that no vehicle offers are to be prioritized, then Merchant A's offer will be prioritized over Merchant B. In another arrangement, the prioritization circuit 174 generates a ranked list of offers based on geo-location of the customer device 116. In one example, if the customer lives proximate Merchant A, the prioritization circuit 174 prioritizes Merchant A offers. As another example, if the customer routinely passes by Merchant B on the way to work, Merchant B may be prioritized even if the customer 106 does not routinely purchase goods at Merchant B.

In another arrangement, the prioritization circuit 174 generates a ranked list of offers based on the spending habits of the customer 106. The spending habits of the customer 106 are retrievably stored in the accounts database 134. In some arrangements, the prioritization circuit 174 determines the type of purchases a customer 106 makes based on the merchant category code (MCC) of the merchants 108 where the purchases are made, retrievable from the accounts database 134. For example, the customer 106 routinely makes purchase at coffee shops. The prioritization circuit 174 then prioritizes offers for all coffee shops. In addition, in some arrangements, the prioritization circuit 174 is configured to time the prioritization of offers based on the customer behavior, preferences, or spending habits. Accordingly, the prioritization circuit 174 is communicably and operatively coupled to the notification circuit 178 to update the offer list on a routine or targeted basis. For example, the customer 106 attends a weekly yoga class every Thursday at Merchant C. In this case, the prioritization circuit 174 prioritizes Merchant C on a weekly basis, specifically around Thursday, such that for most days of the week, Merchant C may not be prioritized, but on Wednesday or Thursday, offers from Merchant C are prioritized. In some arrangements, the prioritization circuit 174 uses a combination of two or more of relevance, geo-location, timing, and spending habits to prioritize the offers for the customer 106. For example, the prioritization circuit 174 can use weighted prioritization to prioritize relevance, geo-location, timing, and spending habits in various ways. As such, in one example, the prioritization circuit 174 may weigh relevance as a higher priority than geo-location or, in another example, may weigh geo-location as higher than timing. Weighted prioritizations can be preset by the customer 106 and stored in the customer profile database 136 for retrieval by the prioritization circuit 174.

The channel selection circuit 176 is structured to select a channel by which to deliver the offers filtered and prioritized by the provider offer aggregation circuit 172 and prioritization circuit 174. Accordingly, the channel selection circuit 176 is communicably and operatively coupled to the provider offer aggregation circuit 172 and the prioritization circuit 174 to receive the filtered, aggregated, and prioritized offers. The channel selection circuit 176 determines an appropriate (e.g., the most appropriate) channel by which to provide an offer. In various instances, the appropriate channel can include a push notification, a text message, an email, a prioritized listing, etc. The channel selection circuit 176 selects a particular channel based on the offer provided. For example, the offer is for an immediate offer to be used at Merchant D, which the customer device 116 is currently proximate. In this case, the channel selection circuit 176 selects a push notification or a text message to the customer device 116 for immediate notification of the customer 106. In another example, if the offers are a "top-ten" style prioritized list of offers, the channel selection circuit 176 selects to transmit and display the offers list as a user interface in the client application 148 for the customer 106 to review in his or her own time. As another example, the channel selection circuit 176 can also select an email or text message channel to request preference input from the customer 106 or to remind the customer 106 of the potential offers waiting for redemption.

The notification circuit 178 is configured to generate and transmit messages regarding offers and user interfaces for display on customer device 116. The notification circuit 178 generates user interfaces as needed to assist the functions of the offer generation system 132 as described above. More particularly, in communication with the other elements of the offer generation system 132 as described above, the notification circuit 178 generates and transmits notifications, messages, and user interfaces that provide customer options to view offers, re-prioritize offers, input preferences, and redeem reward offers, among other potential functions. The notification circuit 178 is also configured to communicate with the channel selection circuit 176 to generate and transmit messages regarding aggregated and filtered merchant offers to the appropriate channel for the customer 106. In some arrangements as shown in FIG. 8, the transmission of the reward offer message "wakes up" the customer device 116 from a sleep or standby mode (e.g., where a display of the customer device 116 passively displays a black screen). In response to the wake-up, the customer 106 is alerted to the reward offer in an almost instantaneous manner. In this way, the customer 106 is alerted of offers that can immediately be used (e.g., at nearby merchants 108). Various user interfaces are described below with regard to FIGS. 6-9.

Figure 3:
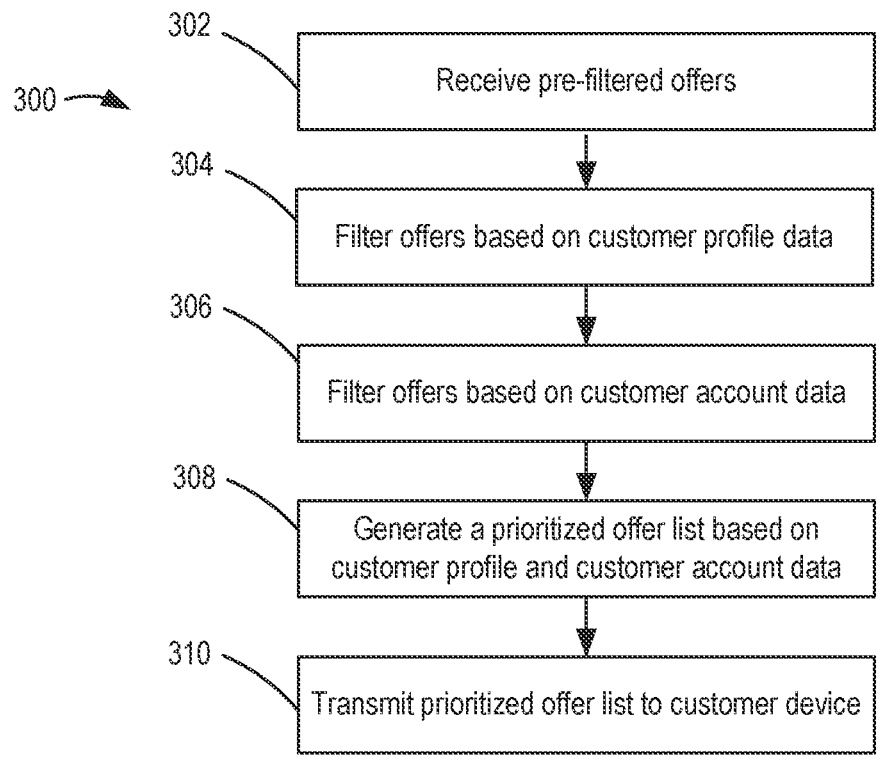
FIG. 3 is a flow diagram of a method of generating an offer, according to an example embodiment.

Referring to FIG. 3, a flow diagram of a method 300 of generating an offer is shown, according to an example embodiment. The method 300 is performed by the provider computing system 112 (e.g., via the provider offer aggregation circuit 172, prioritization circuit 174, and notification circuit 178). Through the method 300, the provider computing system 112 provides aggregated and filtered merchant offers to customers 106.

One or more pre-filtered offers are received at 302. The pre-filtered offers are received at the provider computing system 112 from merchants 108 and/or offer vendors 104. The pre-filtered offers are offers not yet aggregated and filtered by the provider computing system 112, but already processed through a first or second step of aggregation and filtration by the merchants 108 and/or offer vendors 104. In some cases, the offers are directly received from the merchants 108 with no aggregation step completed. In some cases, the pre-filtered offers are received from multiple merchants 108 and multiple offer vendors 104.

The offers are filtered based on customer profile data at 304. In some arrangements, the offers are filtered by the provider offer aggregation circuit 172. The provider offer aggregation circuit 172 aggregates and filters all offers received from the offer vendors 104 and merchants 108. In this way, offers are aggregated across all offer sources (e.g., merchants 108 and offer vendors 104) to provide a further level of filtration. The provider offer aggregation circuit 172 utilizes customer behavior and preferences information stored in the customer profile database 136. As an example, the customer 106 has preset a preference to receive offers from Merchant A. In this case, the provider offer aggregation circuit 172 will filter through offers from Merchant A.

The offers are filtered based on customer account data at 306. In some arrangements, the offers are filtered by the provider offer aggregation circuit 172. The provider offer aggregation circuit 172 utilizes customer financial information stored in the accounts database 134 to filter offers. For example, it is reflected in the accounts database 134 that the customer 106 has never made a purchase from a fast food restaurant. In this case, the provider offer aggregation circuit 172 uses this information to filter out offers from merchants 108 in the fast food business.

A prioritized offer list is generated based on the customer profile and customer account data at 308. In some arrangements, the prioritized offer list is generated by the prioritization circuit 174. The prioritization circuit 174 is structured to prioritize and sort the offer data filtered by the provider offer aggregation circuit 172. The prioritization circuit 174 analyzes the offer data to create a ranked set of prioritized offers (e.g., ranked from highest priority at number one to lowest priority at number ten on an offer list of ten offers). The prioritized offer list is transmitted to the customer device at 310. In some arrangements, the prioritized offer list is transmitted to the customer device 116 by the notification circuit 178. In some arrangements, the notification circuit 178 is also configured to communicate with the channel selection circuit 176 to generate and transmit messages regarding aggregated and filtered merchant offers to the appropriate channel for the customer 106 (e.g., push-notification, text message, email).

Figure 4:
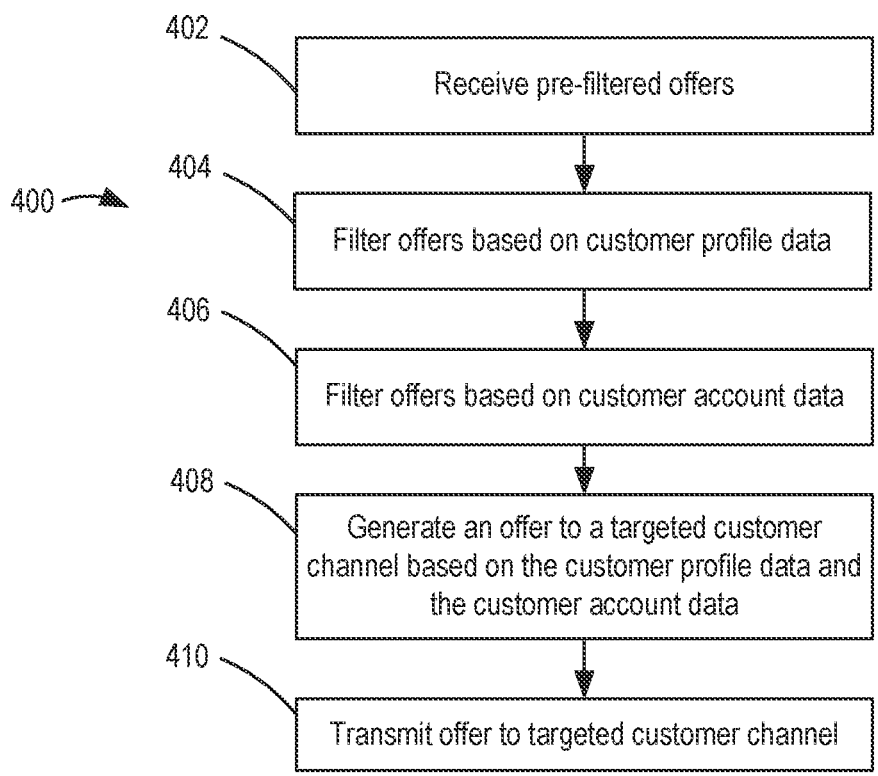
FIG. 4 is a flow diagram of a method of generating an offer, according to an example embodiment.

Referring to FIG. 4, a flow diagram of a method 400 of generating an offer is shown, according to an example embodiment. The method 400 is performed by the provider computing system 112 (e.g., via the provider offer aggregation circuit 172, prioritization circuit 174, channel selection circuit 176, and notification circuit 178). Through the method 400, the provider computing system 112 provides aggregated and filtered merchant offers to customers 106.

One or more pre-filtered offers are received at 402. The pre-filtered offers are received at the provider computing system 112 from merchants 108 and/or offer vendors 104. The pre-filtered offers are offers not yet aggregated and filtered by the provider computing system 112, but already processed through a first step of aggregation and filtration by the merchants 108 and/or offer vendors 104. In some cases, the offers are directly received from the merchants 108 with no aggregation step complete. In some cases, the pre-filtered offers are received from multiple merchants 108 and multiple offer vendors 104.

The offers are filtered based on customer profile data at 404. In some arrangements, the offers are filtered by the provider offer aggregation circuit 172. The provider offer aggregation circuit 172 aggregates and filters all offers received from the offer vendors 104 and merchants 108. In this way, offers are aggregated across all offer sources (e.g., merchants 108 and offer vendors 104) to provide the final level of filtration. The provider offer aggregation circuit 172 utilizes customer behavior and preferences information stored in the customer profile database 136. The offers are filtered based on customer account data at 406. In some arrangements, the offers are filtered by the provider offer aggregation circuit 172. The provider offer aggregation circuit 172 utilizes customer financial information stored in the accounts database 134 to filter offers.

An offer is generated to a targeted customer channel based on the customer profile data and the customer account data at 408. In some arrangements, the targeted customer channel is determined by the channel selection circuit 176. The channel selection circuit 176 is structured to select a channel by which to deliver the offers filtered and prioritized by the provider offer aggregation circuit 172 and prioritization circuit 174. In some arrangements, the channel selection circuit 176 bases the channel selection on the particular offer being provided. For example, if the offer is from a merchant 108 the customer 106 has not visited in a while, the channel selection circuit 176 selects email as the appropriate channel in which to deliver the offer. In other arrangements, the channel selection circuit 176 determines the channel selection in accordance with a customer preference stored in the customer profile database 136.

The offer to a targeted customer channel is transmitted to the customer device at 410. In some arrangements, the offer targeted to a specific customer channel is transmitted to the customer device 116 by the notification circuit 178 using instructions received from the channel selection circuit 176. The channel selection circuit 176 is structured to select a channel by which to deliver the offers filtered and prioritized by the provider offer aggregation circuit 172. In some embodiments, the channel selection circuit 176 first receives prioritized offers from the prioritization circuit 174 prior to instructing the notification of the list of offers by the notification circuit 178. In other embodiments, where a targeted offer is determined to be an offer relevant for the customer 106 in the immediate future (e.g., the customer 106 is walking by the merchant 108 in that moment, the customer 106 will be passing the merchant 108 in the near future), the channel selection circuit 176 communicates with and instructs the notification circuit 178 to immediately provide notification of the offer. In this case, the channel selection circuit 176 may direct the notification circuit 178 to transmit the offer via a push notification or text message on the customer device 116 so that the customer 106 sees the offer in a timely fashion.

Figure 5:
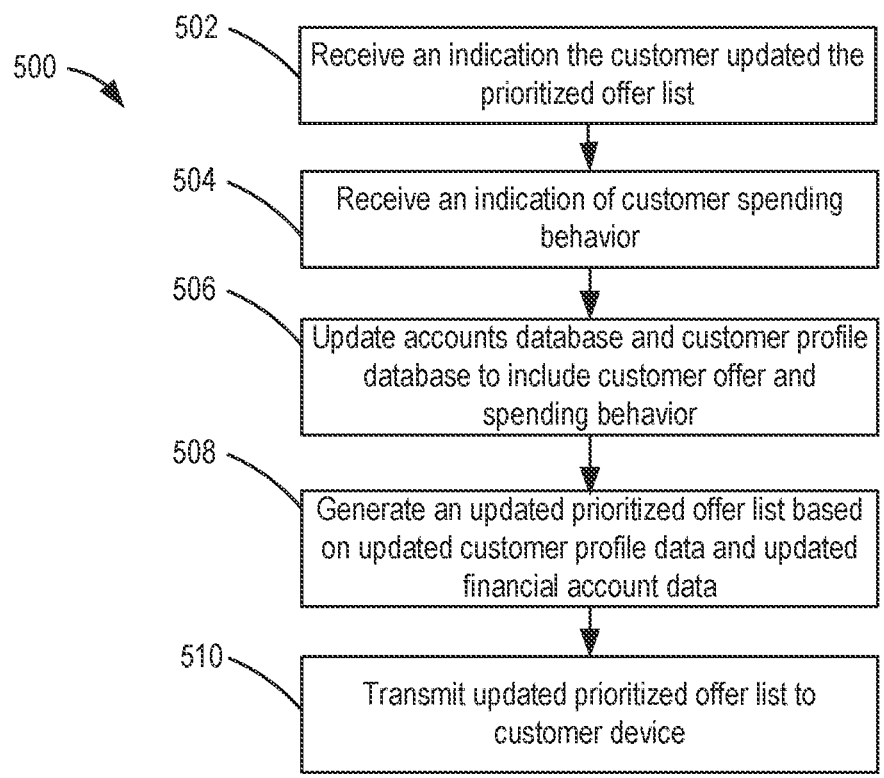
FIG. 5 is a flow diagram of a method of generating an updated prioritized offer list, according to an example embodiment.

Referring to FIG. 5, a flow diagram of a method 500 of generating an updated prioritized offer list is shown, according to an example embodiment. The method 500 is performed by the provider computing system 112. Through the method 500, the provider computing system 112 allows customers 106 to prioritize and/or update preferences regarding a prioritized offer list.

An indication that the customer updated the prioritized offer list is received at 502. In some arrangements, the update indication is received by the offer generation system 132, and more specifically, the prioritization circuit 174. The customer update can include, but is not limited to, a redemption of an offer or a re-prioritization of the prioritized offer list. This type of re-prioritization is received by the offer generation system 132 as a manual input of preference by the customer 106.

An indication of an update in customer spending behavior is received at 504. In some arrangements, the update indication is received by the offer generation system 132. The update to customer spending behavior can include, but is not limited to, a new pattern in spending, such as a new monthly gym membership, an update to the types of offers the customer is redeeming, an update to the types of merchants the customer is regularly visiting, etc. The accounts database and customer profile database are updated to include customer offer and spending behavior at 506. In some arrangements, the accounts database 134 and customer profile database 136 are updated by the offer generation system 132. The received indication that a customer has updated the prioritized list and/or has changed spending behavior is stored in the databases 134, 136 to be later retrieved to update the substance, prioritization, and potential timing of offers provided to the customer.

An updated prioritized offer list is generated based on the updated customer profile data and the updated account data at 508. In some arrangements, the updated prioritized list is generated by the prioritization circuit 174. The prioritization circuit 174 is structured to update the prioritization and sorting of the offer data filtered by the provider offer aggregation circuit 172 based on received updates to explicit customer prioritization of offers and/or updates to customer spending habits. The prioritization circuit 174 analyzes the offer data, as well as data stored in the account database 134 and the customer profile database 136 to create a ranked set of prioritized offers. For example, if a customer 106 redeemed an offer at a merchant, the prioritized offer list would then need to be updated to delete that offer from the list and replace the deleted offer with a new offer. As another example described with regard to FIG. 7 below, the customer 106 can update the order of the offers listed in the prioritized offer list to re-prioritize the offers available.

The updated prioritized offer list is transmitted to the customer device at 510. In some arrangements, the prioritized offer list is transmitted to the customer device 116 by the notification circuit 178. In some arrangements, the notification circuit 178 is also configured to communicate with the channel selection circuit 176 to generate and transmit messages regarding aggregated and filtered merchant offers to the appropriate channel for the customer 106.

Figure 6:
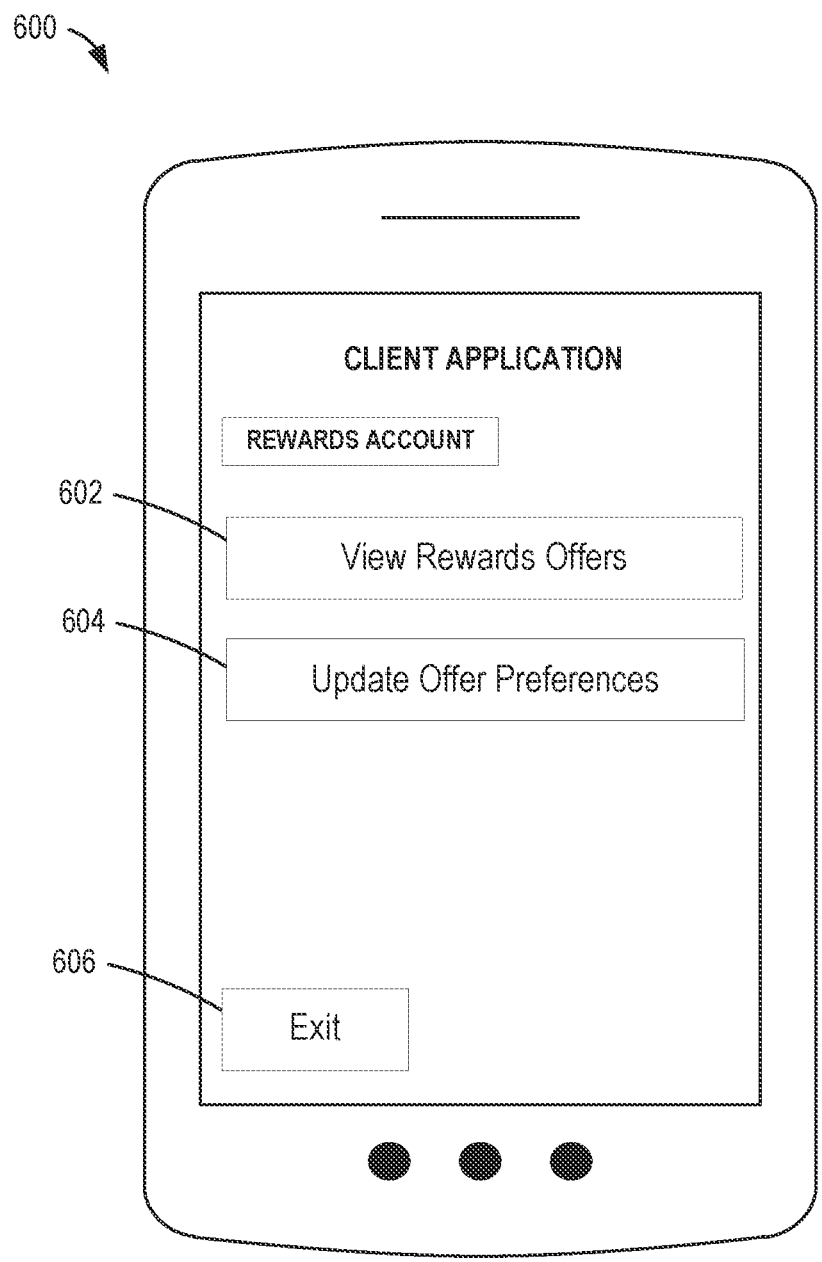
FIG. 6 is a user interface of a customer device for use with the offer generation system of FIG. 1.
Figure 7:
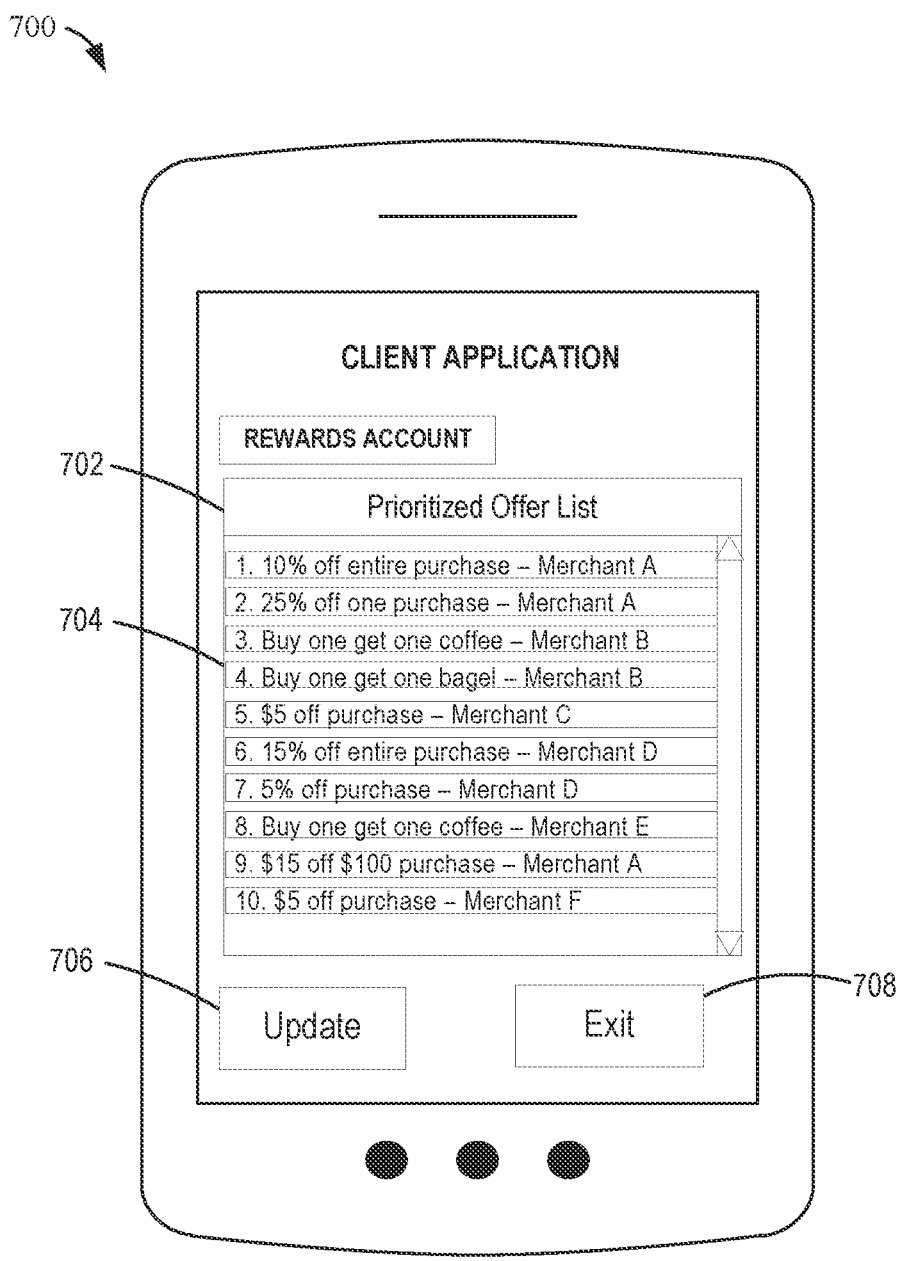
FIG. 7 is a user interface of a customer device during an offer generation and prioritization process as described in the method of FIG. 3.
Figure 8:
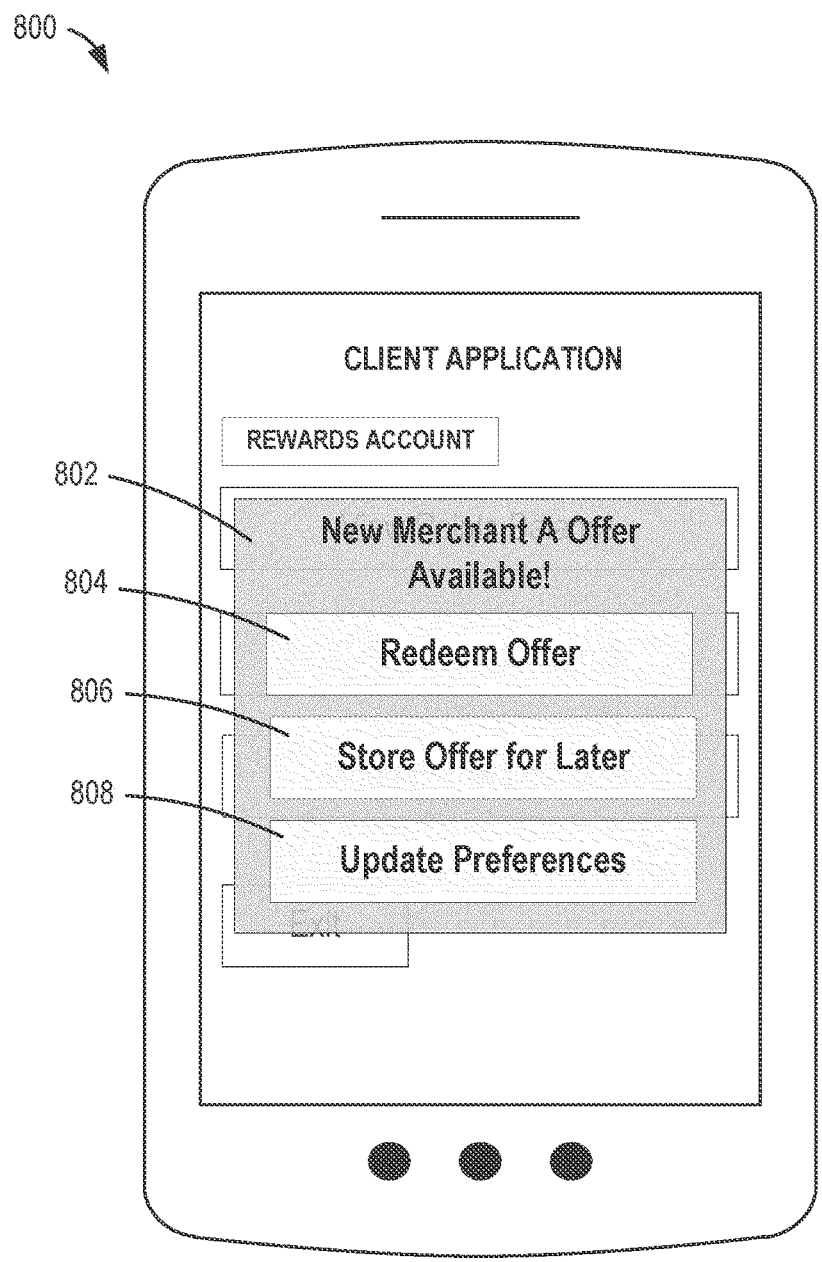
FIG. 8 is a user interface of a customer device during an offer generation and prioritization process as described in the method of FIG. 4.

Referring to FIGS. 6-8, various user interfaces displayed by the system 100 are shown, according to example embodiments. The user interfaces may be displayed to the customer 106 on the customer device 116 (e.g., via the client application 148). The customer 106 first logs into the client application 148 or to a mobile banking website portal via the customer device 116 to access the banking portal. Through the banking portal, the customer 106 can select from a number of options relating to the customer's rewards offers. The options include a "View Rewards Offers" selection 602, an "Update Offer Preferences" selection 604, and an "Exit" selection 606. If the customer 106 selects the "View Rewards Offers" selection 602, the user interface of the banking portal updates to display the customer's rewards offers options at 702 (as shown in FIG. 7). If the customer 106 selects the "Update Offer Preferences" selection 604, the customer 106 can then input preferences into the system 100. For example, the customer 106 can add a favorite merchant 108, update prioritization preferences (e.g., customer 106 can select to always receive offers from a particular merchant or a type of merchant), add an interest or hobby, a new home address, etc., into the system 100. When a customer 106 makes an update to the offer preferences, the offer generation system 132 updates the customer profile database 136 and/or the accounts database 134 with the updated information for later retrieval during offer generation.

As shown in FIG. 7, a prioritized offer list is displayed when selection 602 is chosen. For example, the prioritized offer list 702 is shown as a "top-ten" type of list. The list can include more or less than ten offers. Each offer selection 704 in the prioritized offer list 702 is selectable and movable such that a customer 106 can click on an offer selection 704, for example, Offer 3 "Buy one get one coffee—Merchant A" and move Offer 3 up or down. By moving the selection 704 up the list (e.g., moving Offer 3 above Offer 2), the customer 106 indicates that the selection 704 is a higher priority offer. By moving the selection 704 down the list (e.g., moving Offer 3 below Offer 4), the customer 106 indicates that the selection 704 is a lower priority offer. Once the customer 106 has completed the re-prioritization of offers, the customer 106 can select the "Update" selection 706 to submit the update to the system 100. The customer 106 can select the "Exit" selection 708 to return to the user interface shown in FIG. 6.

Referring to FIG. 8, the user interface of FIG. 6 is shown with an overlaid offer notification 802. In this example, the offer notification 802 includes a direct notification of a targeted offer generated by the offer generation system 132. In addition to generating a prioritized offer list 702 as shown in FIG. 7, the offer generation system 132 also generates notifications of direct, single offers to the customer device 116. In some arrangements, the direct, single offers are generated based on a customer preference. In some arrangements, the offers are generated based on the geo-location of the customer 106. For example, if the customer 106 is proximate Merchant A and an offer is available for Merchant A, the offer generation system 132 generates and transmits the notification 802 on a real-time basis to the customer device 116 such that the customer 106 is timely notified of the offer. To redeem the offer immediately, the customer 106 can select the "Redeem Offer" selection 804. If the customer 106 is proximate Merchant A, for example, the customer 106 can walk into Merchant A and complete a transaction using, at least partially, the available offer. To store the reward for later use, the customer 106 can select the "Store Reward for Later" selection 806. This selection 806 adds the offer to the prioritized offer list 702 shown in FIG. 7. To update preferences such as adding a preference to no longer see offers from Merchant A, the customer 106 can select the "Update Preferences" selection 808.

Figure 9:
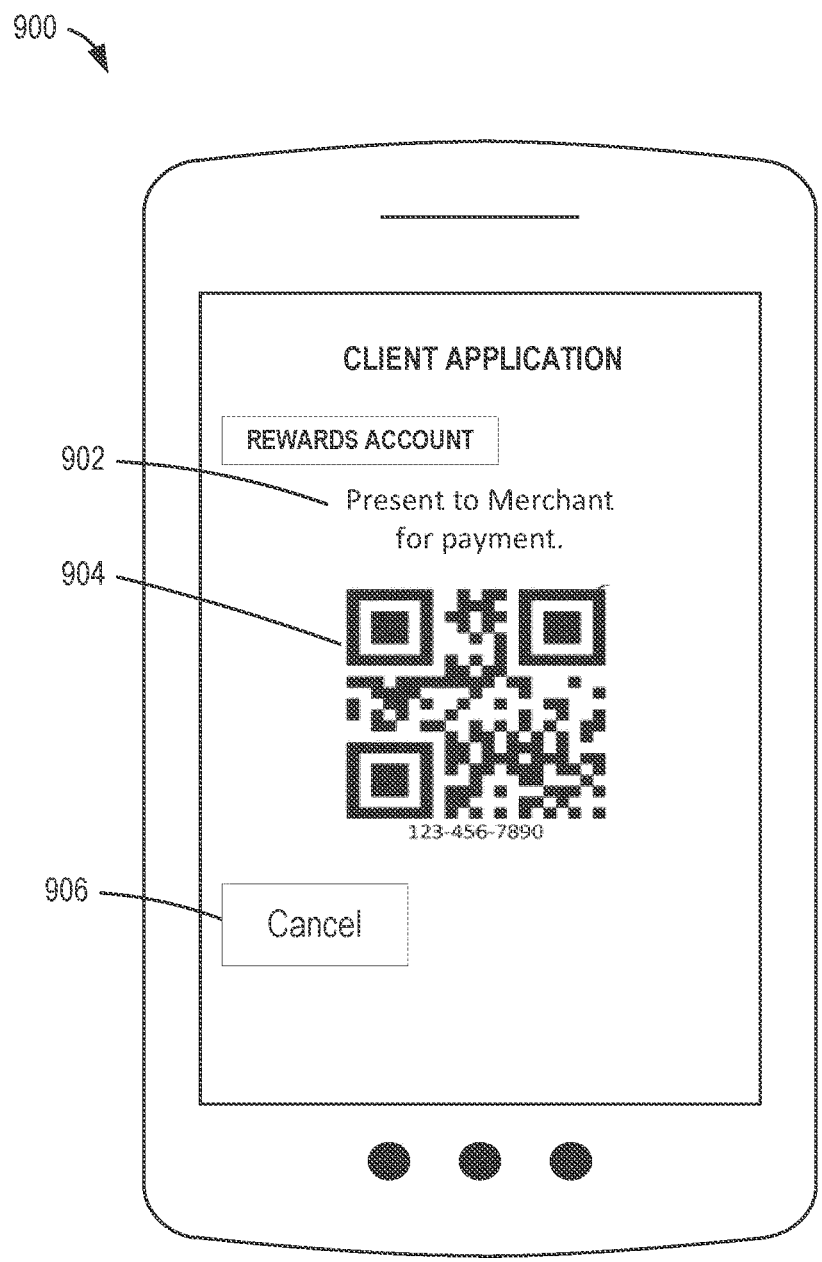
FIG. 9 is a user interface of a customer device during an offer redemption and payment process.

In some arrangements, if the customer 106 indicates a preference to redeem the offer through the "Redeem Offer" selection 804 shown in FIG. 8, the customer 106 is then brought to the interface 900 shown in FIG. 9. FIG. 9 displays an interface 900 presented on the customer device 116 including offer redemption instructions 902 and an offer redemption method 904. The redemption instructions 902 instruct the customer 106 regarding the next step to redeem the offer. After redemption, the redemption instructions 902 notify the customer 106 that the reward has been redeemed. In the case where the reward offer involves enabling the customer 106 to pay for an identified transaction, the redemption instructions 902 prompt the customer 106 to take additional steps to redeem the offer. As shown, the redemption instructions 902 prompt the customer 106 to present the redemption method 904 to a merchant 108. As shown, the redemption method 904 is a QR code through which the customer can complete a previously identified transaction, by having the merchant 108 scan the QR code. As a person having ordinary skill in the art will appreciate, the appearance of the various depictions and graphics discussed herein will take on different forms based on the plurality of different implementations of offer redemption systems.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computing system comprising one or more processors configured to:
   receive a connection request from a client application installed on a user device of a user such that the client application is communicably coupled to the computing system;
   monitor a location of the user device and maintain and update a location history of the user by storing the location in one or more data structures of a user profile of the user;
   receive a plurality of offers from merchant computing systems, wherein each offer of the plurality of offers includes an identifier of a corresponding offer merchant;
   generate a graphical user interface configured to display an updated prioritized offer list comprising fewer offers than the plurality of offers by filtering and prioritizing the offers in the plurality of offers based on the location history of the user, account information in an accounts database, and a location of each offer merchant corresponding to each offer in the plurality of offers, the graphical user interface further configured to enable adjustment of a respective position of each offer in the updated priority list to reflect corresponding updated priorities of each offer in the updated priority list;
   provide the graphical user interface comprising the updated prioritized offer list to the user device for display;
   receive, via the graphical user interface displayed at the user device, an adjustment to a priority of each offer in the updated prioritized offer list responsive to input at the user device, the adjustment indicating an adjusted position of each offer in the updated prioritized offer list;
   select an immediate offer from the updated prioritized offer list based on (i) the adjustment to the priority of each offer in the updated prioritized offer list, and (ii) the location of the user device indicating that the user is currently standing outside the location of one of the offer merchants;
   transmit the immediate offer to the client application for display in the client application installed on the user device;
   receive, from the client application, a user selection to redeem the immediate offer;
   transmit a QR code associated with the immediate offer for display by the user device and presentation during payment at the offer merchant associated with the immediate offer to redeem the immediate offer; and
   receive, from the offer merchant, a notification indicating that the immediate offer was redeemed.

2. The computing system of claim 1, the one or more processors further configured to generate a filtered offer list based on the plurality of offers, the generating of the filtered offer list comprising filtering and prioritizing the plurality of offers based on the location history.

3. The computing system of claim 2, the one or more processors further configured to receive, from the client application, an adjusted offer list based on the user adjusting positions of offers in the filtered offer list displayed in the graphical user interface, wherein adjusted positions of offers correspond to a manually input user preference for offer merchants associated with offers in the adjusted offer list.

4. The computing system of claim 2, wherein the filtered offer list is a first filtered offer list, wherein the one or more processors are further configured to filter the first filtered offer list based on the user profile to generate a second filtered offer list, the user profile comprising the location history of the user, and wherein the second filtered offer list comprises a subset of the first filtered offer list.

5. The computing system of claim 3, wherein the immediate offer is a first offer and wherein the one or more processors are further configured to select a second offer from the adjusted offer list based on the user profile and the location of the user device being proximate to a second offer merchant associated with the second offer.

6. The computing system of claim 2, the one or more processors further configured to:
   receive user preference information manually entered into the client application installed on the user device and storing the user preference information stored in the user profile; and
   generate an updated filtered offer list for the user based on the received user preference information.

7. The computing system of claim 6, wherein the user preference information comprises a user-selected prioritization of the filtered offer list.

8. The computing system of claim 1, wherein the one or more processors are further configured to transmit, to the user device, a push notification comprising the immediate offer.

9. The computing system of claim 1, wherein the one or more processors are further configured to transmit, to the user device, a text message comprising the immediate offer.

10. The computing system of claim 1, wherein the one or more processors are further configured to transmit an email comprising the immediate offer to the user associated with the user device.

11. The computing system of claim 1, wherein the one or more processors are further configured to transmit a request to wake up the user device.

12. A computer-implemented method comprising:
    receiving, by a computing system, a connection request from a client application installed on a user device of a user such that the client application is communicably coupled to the computing system;

receiving, by the computing system, a current location of the user device and maintaining and updating a location history of the user by storing the current location in one or more data structures of a user profile of the user;

receiving, by the computing system, a plurality of offers from merchant computing systems, wherein each offer of the plurality of offers includes an identifier of a corresponding offer merchant;

generating, by the computing system, a graphical user interface configured to display an updated prioritized offer list comprising fewer offers than the plurality of offers based on the location history of the user, account information in an accounts database, and a location of each offer merchant corresponding to each offer in the plurality of offers, the graphical user interface further configured to enable adjustment of a respective position of each offer in the updated priority list to reflect corresponding updated priorities of each offer in the updated priority list;

providing, by the computing system, the graphical user interface comprising the updated prioritized offer list to the user device for display;

receiving, by the computing system, via the graphical user interface displayed at the user device, an adjustment to a priority of each offer in the updated prioritized offer list responsive to input at the user device, the adjustment indicating an adjusted position of each offer in the updated prioritized offer list;

selecting, by the computing system, an immediate offer from the updated prioritized offer list based on (i) the adjustment to the priority of each offer in the updated prioritized offer list, and (ii) an indication that the user is currently standing outside the location of one or the offer merchants;

transmitting, by the computing system, the immediate offer to the client application for display in the client application installed on the user device;

receiving, by the computing system, from the client application, a user selection to redeem the immediate offer;

transmitting, by the computing system, a QR code associated with the immediate offer for display in by the user device and presentation during payment at the offer merchant associated with the immediate offer to redeem the immediate offer; and receiving, by the computing system, from the offer merchant, a notification indicating that the immediate offer was redeemed.

13. The method of claim 12, further comprising generating a filtered offer list based on the plurality of offers by filtering and prioritizing the plurality of offers based on the location history.

14. The method of claim 13, further comprising receiving, from the client application, an adjusted offer list based on the user adjusting positions of offers in the filtered offer list displayed in the graphical user interface, wherein adjusted positions of offers correspond to a manually input user preference for offer merchants associated with offers in the adjusted offer list.

15. An apparatus comprising:
a user profile and accounts database storing spending habit information for a user, the user profile and accounts database storing account information associated with accounts held by a provider; and a provider computing system associated with the provider comprising one or more processors configured to:
receive a connection request from a client application installed on a user device of the user such that the client application is communicably coupled to the provider computing system;

receive a current location of the user device and maintain and update a location history of the user by storing the current location in one or more data structures of the user profile of the user;

receive a plurality of offers from merchant computing systems, wherein each offer of the plurality of offers includes an identifier of a corresponding offer merchant;

generate a graphical user interface configured to display an updated prioritized offer list comprising fewer offers than the plurality of offers by filtering and prioritizing the offers in the plurality of offers based on the location history, the account information, and a location of each offer merchant corresponding to each offer in the plurality of offers, the graphical user interface further configured to enable adjustment of a respective position of each offer in the updated priority list to reflect corresponding updated priorities of each offer in the updated priority list;

provide the graphical user interface comprising the updated prioritized offer list to the user device for display;

receive, via the graphical user interface displayed at the user device, an adjustment to a priority of each offer in the updated prioritized offer list responsive to input at the user device, the adjustment indicating an adjusted position of each offer in the updated prioritized offer list;

select an immediate offer from the updated prioritized offer list based on (i) the adjustment to the priority of each offer in the updated prioritized offer list, and (ii) an indication that the user is currently standing outside the location of one of the offer merchants;

transmit the immediate offer to the client application for display in the client application installed on the user device;

receive, from the client application, a user selection to redeem the immediate offer;

transmit a QR code associated with the immediate offer for display by the user device and presentation during payment at the offer merchant associated with the immediate offer to redeem the immediate offer; and receive, from the offer merchant, a notification indicating that the immediate offer was redeemed.

16. The apparatus of claim 15, the one or more processors further configured to:
generate a filtered offer list based on the plurality of offers by filtering and prioritizing the plurality of offers based on the location history;.

17. The apparatus of claim 16, the one or more processors further configured to receive, from the client application, an adjusted offer list based on the user adjusting positions of offers in the filtered offer list displayed in the graphical user interface, wherein adjusted positions of offers correspond to a manually input user preference for offer merchants associated with offers in the adjusted offer list.

18. The apparatus of claim 15, the one or more processors further configured to select a user channel based on the location history and the user profile, the user channel based on at least one of a push notification, a text message, an email, a prioritized listing, or a user interface.

\* \* \* \* \*